July 17, 1956 D. F. PRZYBYLSKI 2,754,977
GRAVE DIGGER
Filed Oct. 25, 1951 6 Sheets-Sheet 1

INVENTOR.
DANIEL F. PRZYBYLSKI
BY
ATTORNEY

July 17, 1956 D. F. PRZYBYLSKI 2,754,977
GRAVE DIGGER
Filed Oct. 25, 1951 6 Sheets-Sheet 2
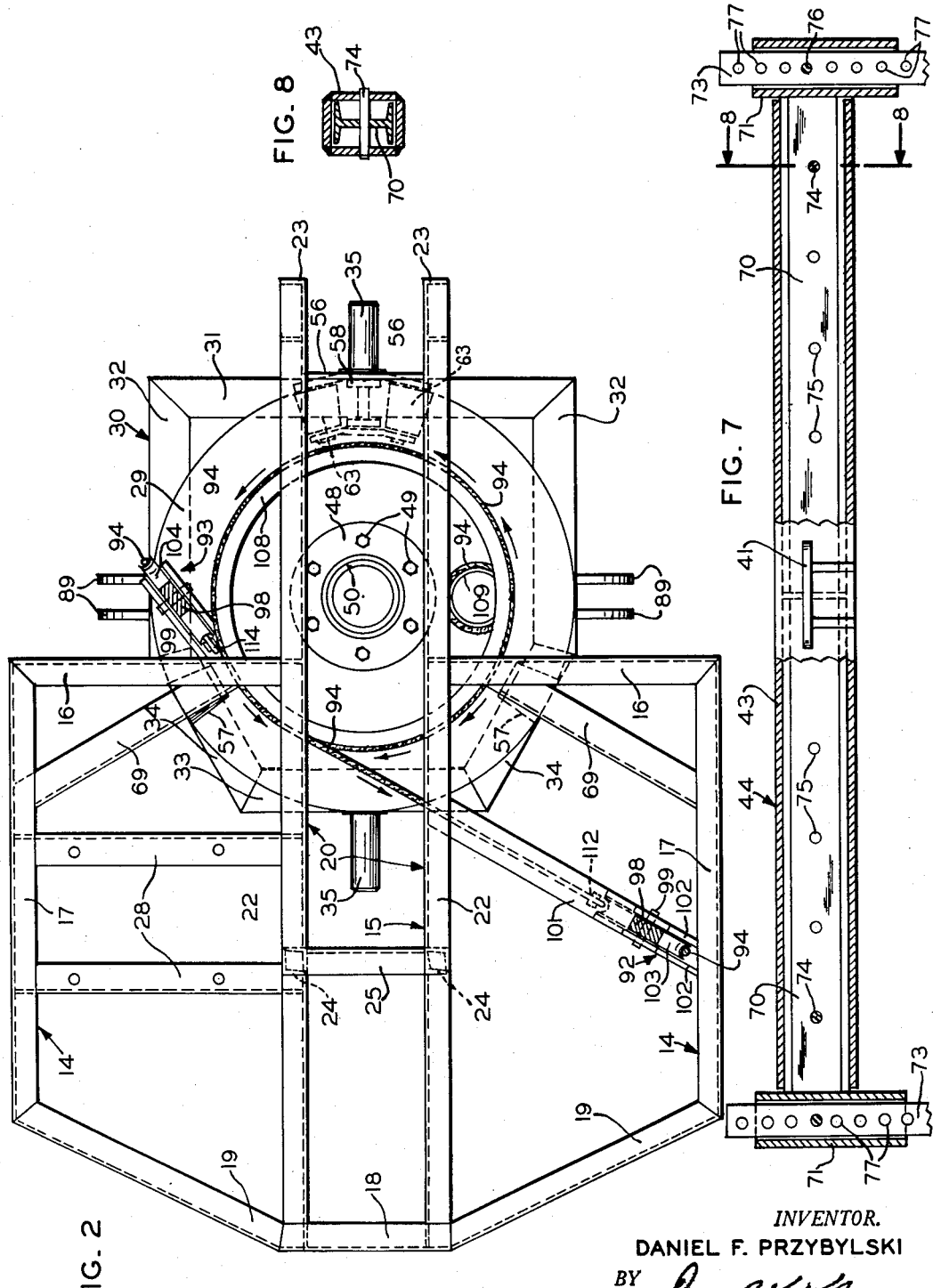
INVENTOR.
DANIEL F. PRZYBYLSKI
BY
ATTORNEY

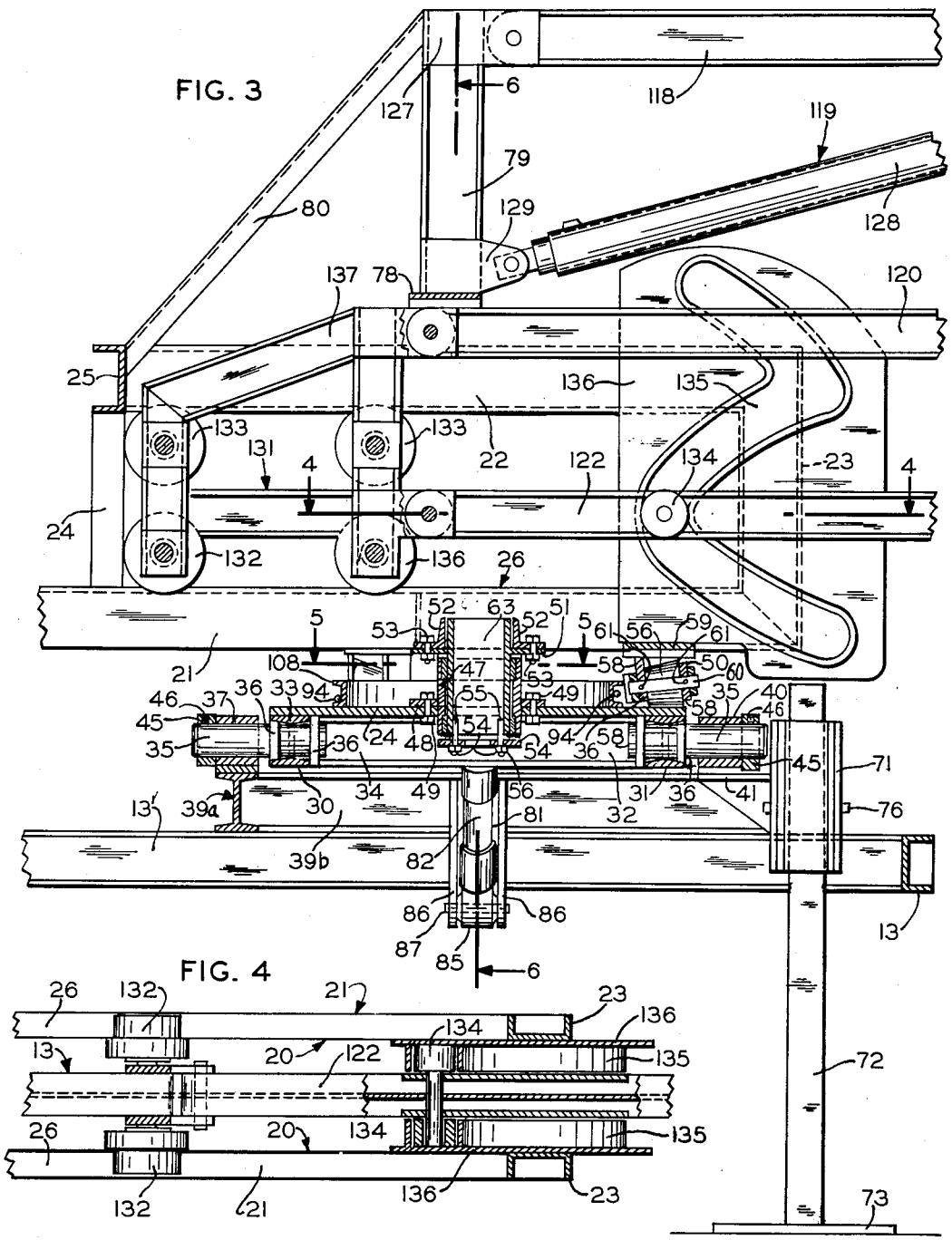

July 17, 1956  D. F. PRZYBYLSKI  2,754,977
GRAVE DIGGER
Filed Oct. 25, 1951  6 Sheets-Sheet 4
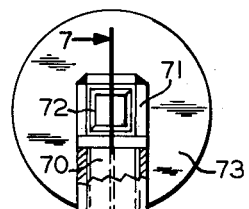
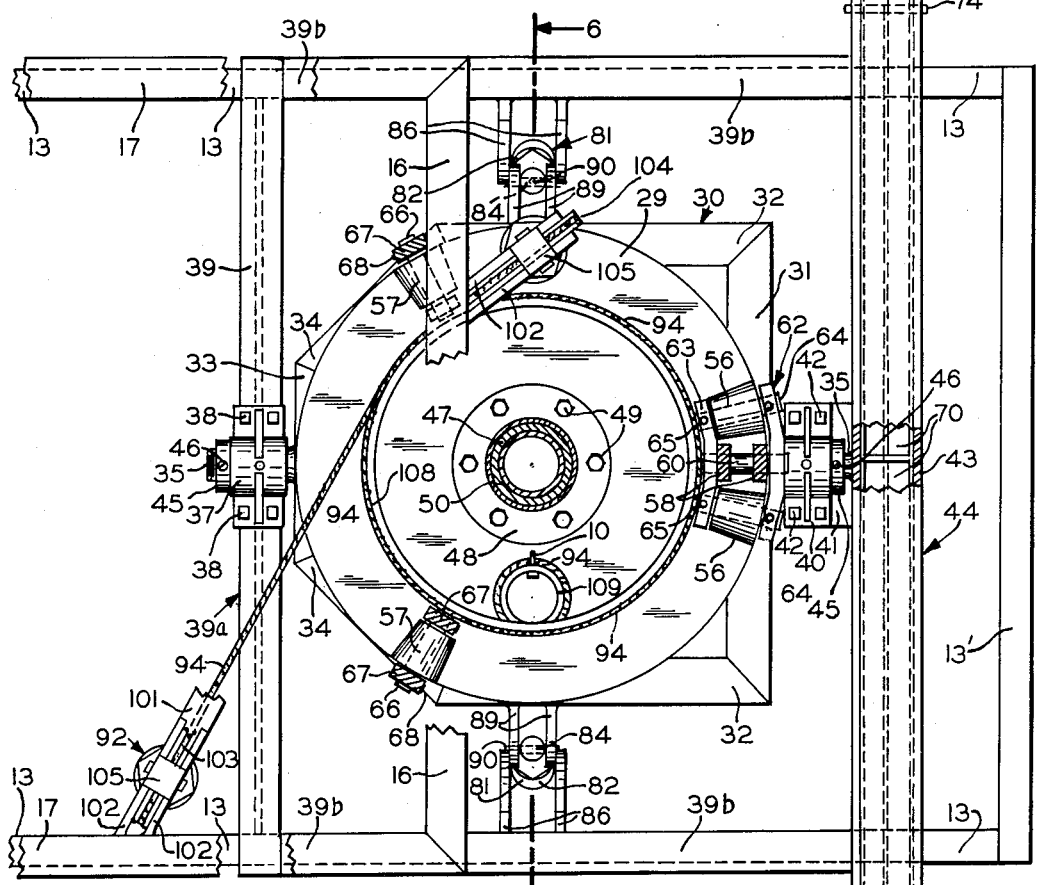
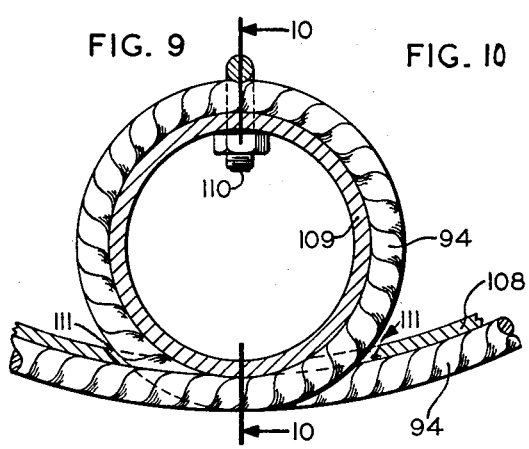
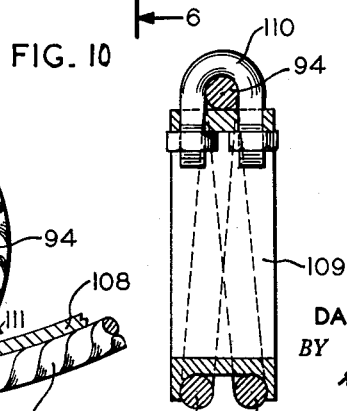
INVENTOR.
DANIEL F. PRZYBYLSKI
BY
ATTORNEY July 17, 1956  D. F. PRZYBYLSKI  2,754,977
GRAVE DIGGER Filed Oct. 25, 1951  6 Sheets-Sheet 6

INVENTOR.
DANIEL F. PRZYBYLSKI
BY
ATTORNEY

United States Patent Office 2,754,977
Patented July 17, 1956

2,754,977
GRAVE DIGGER
Daniel F. Przybylski, Winona, Minn.

Application October 25, 1951, Serial No. 253,181

7 Claims. (Cl. 212—67)

My present invention relates to trenching machines and, more particularly, to grave diggers.

An object of this invention is to provide a novel portable frame structure.

Another object is to provide novel means for leveling the frame structure.

A further object is to provide novel means for turning the frame structure about a vertical axis.

Other objects of this invention will be apparent from the following description, reference being had to the drawings.

To the above end, generally stated, the invention consists of the novel devices and combination of devices hereinafter described and defined in the claims.

In the accompanying drawings, which illustrate the invention, like characters indicate like parts throughout the several views.

Referring to the drawings:

Fig. 2 is a plan view of the upper and sub-frame assembly, the turntable and the tilting frame assemblies and also showing the swing rams and their mounts, the former being sectioned just above the sub-frame;

Fig. 3 is a fragmentary view partly in side elevation and partly in section taken substantially on the line 3—3 of Fig. 6;

Fig. 4 is a fragmentary view partly in plan and partly in section taken on the line 4—4 of Fig. 3;

Fig. 5 is a view principally in plan with some parts sectioned on the line 5—5 of Fig. 3, and with some parts broken away;

Fig. 7 is a view partly in rear elevation and partly in section taken on the line 7—7 of Fig. 5;

Fig. 8 is a detail view principally in section taken on the line 8—8 of Fig. 7;

Fig. 9 is a fragmentary detail view partly in plan and partly in section taken on the line 9—9 of Fig. 6, on a greatly enlarged scale;

Fig. 10 is a detail view principally in section taken on the line 10—10 of Fig. 9.

Figure 1:
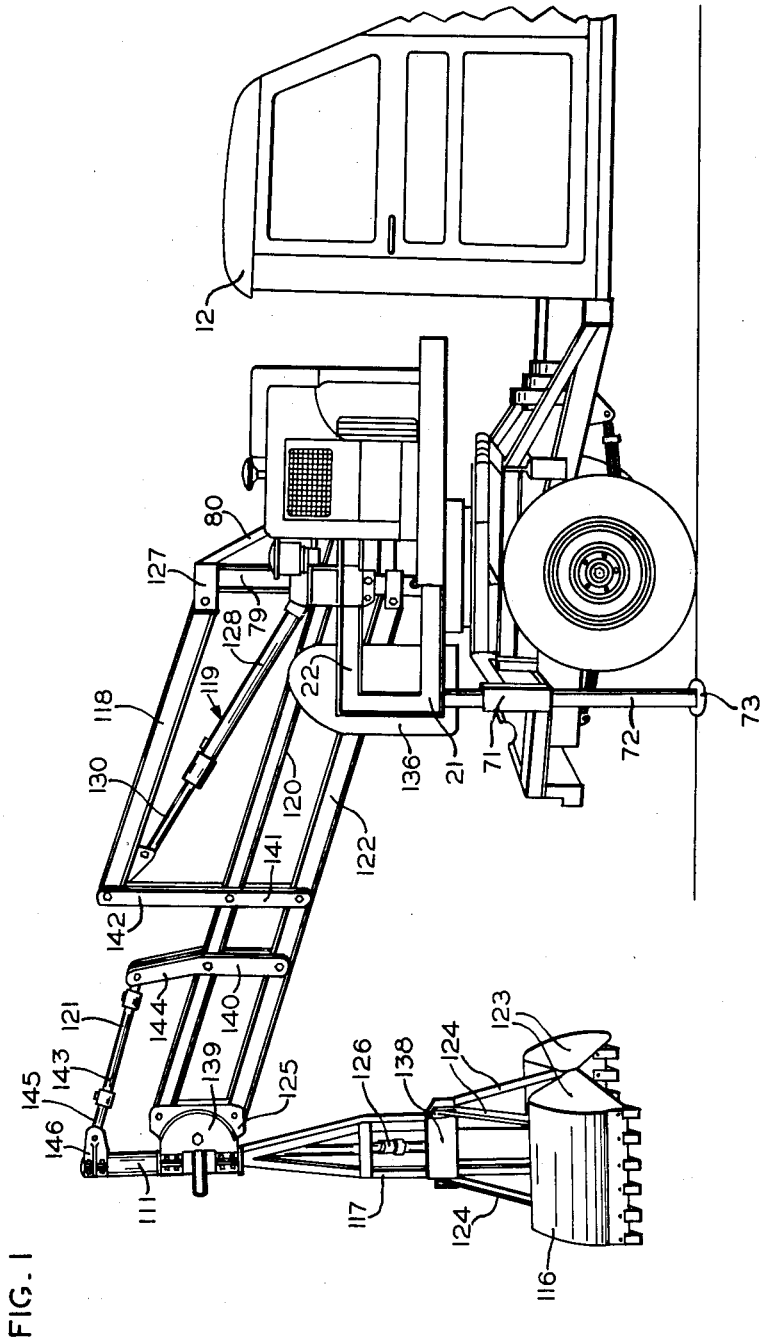
Fig. 1 is a perspective view of the invention mounted on a self-propelled truck.
Figure 6:
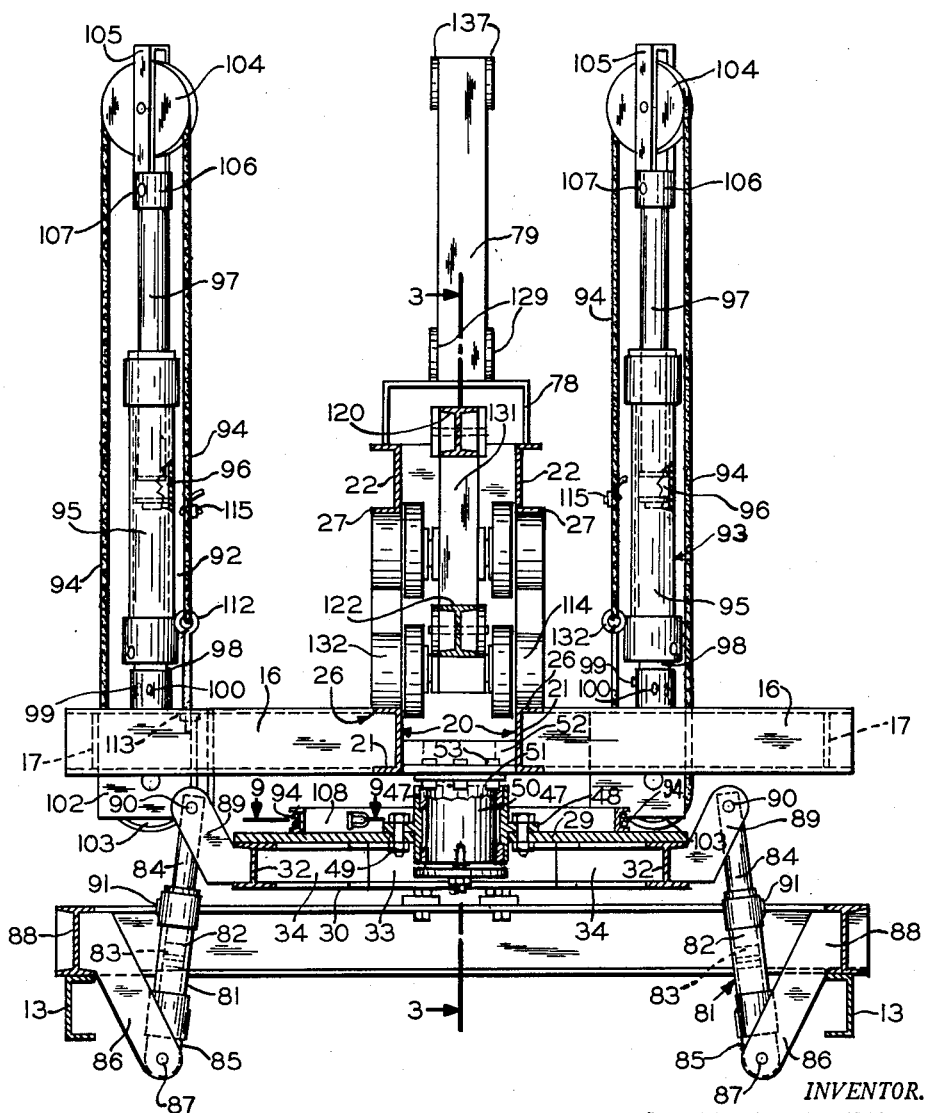
Fig. 6 is a view partly in front elevation and partly in transverse section taken on the lines 6—6 of Figs. 3 and 5.

The improved grave digger, as shown in Fig. 1 of the drawings, is mounted on the front end portion of a self-propelled truck indicated as an entirety by the numeral 12, with the exception of the two longitudinal channel bars 13 connected at their front ends by a transverse channel bar 13' that form part of the truck bed. The webs of the channel bars 13 are vertically disposed and the flanges thereof are turned inwardly, see Fig. 6.

The grave digger includes a sub-frame 14 and an upper frame 15, the former being horizontally disposed and comprises a front member 16, two side members 17 and a rear member having a central section 18 that is parallel to the front member 16 and end sections 19 that are in forwardly diverging relation. The members of the sub-frame 14 are each a channel bar, the flanges of which are turned inwardly, see Figs. 2 and 3.

The upper frame 15 includes a pair of parallel side members 20, each comprising a lower longitudinal member 21, an overlying upper member 22, a short upright member 23 that rigidly connects the members 21 and 22 at their front end and a post 24 that rigidly connects the upper member 22 at its rear end to the lower member 21. A short transverse member 25 rigidly connects the upper members 22 at their rear ends.

The lower longitudinal members 21 extend centrally through the sub-frame 14 in the plane thereof and are rigidly secured, at their rear ends, to the central section 18 of said frame. These lower members 21 of the upper frame 15 extend through a central gap in the front member 16 of the sub-frame 14 and materially forwardly thereof. The sections of the front member 16 are rigidly secured to the longitudinal members 21, see Figs. 2 and 3.

The members 21, 22, 23 and 25 are each a channel bar, the webs of which are upright and the flanges of which are turned outwardly. Each post 24 is formed of two angle bars rigidly connected. The upper members 22, at their rear ends, terminate materially short of the rear ends of the lower members 21. The upper flanges of the lower members 21 and lower flanges of the upper members 22, between the upright members 23 and the posts 24, afford track rails 26 and 27, respectively, for a purpose that will presently appear.

A motor mount or base 28 is formed of a pair of laterally spaced angle bars that extend transversely between the left-hand side member 17 and the left-hand lower longitudinal member 21 and are rigidly secured thereto, see Fig. 2.

The grave digger further includes an annular turntable 29 mounted on a tilting frame 30 comprising a front member 31, two side members 32 and a rear member comprising a central section 33 and end sections 34 in forwardly diverging relation. Each section 31, 32, 33 and 34 is an I-bar. The tilting frame 30 is provided with a pair of diametrically axially aligned trunnions 35 that extend longitudinally of the transverse center of the sub-frame 14. These trunnions 35, at their inner end portions, extend inwardly through axially aligned holes in inner and outer plates 36 and the webs of the member 31 and the central section 33 of the rear member. The plates 36 are rigidly secured to the flanges of the member 31 and the section 33, see Figs. 2, 3 and 5.

The rear trunnion 35 is journaled in a bearing 37 which rests on and is secured by bolts 38 to the transverse or rear member 39 of a U-frame 39ª, the side members of which are designated by the numeral 39ᵇ. This frame 39ª is formed of I-bars that rest on the side bars 13 of the truck bed and secured thereto. The front trunnion 35 is journaled in a bearing 40, that rests on a shelf 41, and is secured thereto by bolts 42. This shelf 41 is rigidly secured to the inner side of a long horizontal body member 43 at its longitudinal center and forms a part of a stabilizer 44. The stabilizer body member 43 is tubular, rectangular in cross-section and extends transversely of the digger with its end portions resting on the channel bars 13 and secured to the front ends of the side member 39ᵇ of the frame 39ª, see Figs. 5 and 7. Collars 45 on the trunnions 35, outwardly of the bearings 37 and 40, are secured thereto by set screws 46 and hold said trunnions from shifting endwise in bearings 37 and 40.

The turntable 29 is provided with a sleeve bearing 47 axially aligned therewith and extending both above and below said turntable. This bearing 47 is provided with an annular flange 48 that rests on the turntable 29 and is secured thereto by bolts 49.

The upper frame 15 is provided with a pivot member 50 turnably mounted in the bearing 47. This pivot member 59 is in the form of a cylinder having near its upper end portion a rectangular flange 51 that extends under the outturned flange of a pair of angle bars 52, between which the pivot member 50 extends. These angle bars 52 extend transversely between the lower longitudinal members 21 of the upper frame 15, forwardly of the subframe 14, and are rigidly secured thereto at their ends. The angle bars 52 afford crossties for the frame side members 21 and the flange 41 is secured thereto by bolts 53. Obviously, the bearing 47 and the pivot member 50 afford a swivel that connects the frames 14 and 15 to the turntable 29 to swing about a vertical axis. The pivot member 50 is held from lifting from the bearing 47 by an annular plate 54 held suspended under said bearing with a working clearance by nut-equipped screw studs 55. These studs 55 extend into the pivot member 50, are rigidly secured thereto and also extend through holes in the plate 54. Nuts 54ª on the studs 55 support the plate 54 thereon, see Figs. 3 and 5.

The two frames 14 and 15 are supported on the turntable 29, to turn about its axis, by a pair of wide front conical rollers 56 and a similar pair of rollers 57 located one on each side of said turntable. A mount for the pair of front rollers 56 includes a pair of connected depending ears 58 rigidly secured to a crosstie plate 59 that extends between the longitudinal members 21 and secured thereto at its ends. A pin 60 extends through a pair of aligned holes in the ears 58 and are held from turning therein by setscrews 61. A bracket 62 comprising a pair of horizontally disposed bars 63 having at their longitudinal centers holes through which the end portions of the pin 60 project and support said bars to turn thereon. The central portions of the bars 63 extend tangentially to the perimeter of the turntable 29, and the end portions of said bars are bent inwardly to conform to the curvature of said perimeter. A pair of pins 64 extend through pairs of aligned holes in the end portions of the bars 63 and are held from turning therein by setscrews 65. The rollers 56 are journaled one on each of the pins 64 between the bars 63, see Figs. 2, 3 and 5.

Each roller 57 is journaled on a pin 66 that extends through aligned holes in a connected pair of depending ears 67. Setscrews 68 hold the pins 66 from turning in the ears 67. The connected ears 67 are rigidly secured to and depend from oblique angle bars 69 secured to the frame members 16 and 17. The pins 64 and 66 extend on lines radiating from the axis of the turntable 29. The rollers 56 and 57 are arranged to run on the turntable 29 and support the two frames 14 and 15 therefrom, see Figs. 2, 3 and 5.

Referring again to the stabilizer 44, see Figs. 5, 7 and 8, a long stabilizer extension 70 is slidably mounted in each end portion of the stabilizer body member 43. On the outer end of each stabilizer extension 70 is a vertical tubular guide 71 that is rectangular in cross-section and extends both above and below said extension. A long leg 72 is slidably mounted in each guide 71 for endwise adjustment and has on its lower end a large annular ground-engaging foot 73. Each stabilizer extension 70 is an I-bar adjustably connected to the stabilizer body member by a pin 74 that extends endwise through a pair of aligned holes in said body member and any one of a plurality of longitudinally spaced holes 75 in the web of the respective stabilizer extension 70. Each leg 72 is tubular, rectangular in cross-section and formed of two angle bars rigidly connected. Each leg 72 is held in its guide 71, where endwise adjusted, by a pin 76 that extends endwise through a pair of holes in said guide and any one of a plurality of longitudinally spaced holes 77 in said leg.

A yoke-like base member 78 that is transversely flat, extends transversely over the upper frame 15 with its legs resting on the upper flanges of the upper member 22 of said frame and rigidly secured thereto. A post 79 in the form of an I-bar rests on the base member 78 and is rigidly secured thereto with its web in the plane of the transverse center of the frames 14 and 15. An oblique brace 80 in the form of an angle bar connects the post 79 at its back and upper end to the rear frame member 25 at its intermediate portion.

The turntable 29 and its frame 30 are tilted about the axes of the trunnions 35 and are held where tilted by a pair of diametrically opposite hydraulic rams 81 located on a line perpendicular to the aligned axes of the trunnions 35. Each ram 81 includes a cylinder 82 and a cooperating piston 83 having a piston rod 84. The rams 81 are upright and slightly inwardly inclined with their piston rods 84 uppermost. Each cylinder 82 has on its lower end a lug 85 that extends between a pair of long ears 86 and is connected thereto by a pivot pin 87, that extends through aligned holes in said lug and ears. The ears 86 are rigidly secured to the side members 39ᵇ of the frame 39ª. The piston rod 84, of each ram 81, extends between a pair of upstanding outwardly inclined ears 89 fixed to the side members 32 of the tilting frame 30, and is secured thereto by a pin 90 that projects through aligned holes in said piston rod and ears. On the upper end portion of each cylinder 82 is a fitting 91 through which fluid is introduced into said cylinder to operate the piston 83, see Figs. 3, 5 and 6.

The frames 14 and 15 are turned about the axis of the bearing 47 by a pair of upstanding duplicate hydraulic rams 92 and 93 and a cable 94. Each ram 92—93 includes a cylinder 95 and a cooperating piston 96 having a piston rod 97 that is uppermost. On the lower end of each cylinder 95 is a lug 98 that extends between a pair of upstanding ears 99 and secured thereto by a pivot pin 100. These ears 99 are secured to one end portion of a flat horizontal bar 101 which, in turn, at the respective end, rests on the upper longitudinal edges of a pair of flat bearing plates 102 and is fixed thereto. The bearing plates 102 for the ram 92 are rigidly secured to the right-hand side member 17 of the sub-frame 14, on the inner side thereof, and extend obliquely thereto. The bearing plates 102 for the ram 93 are secured to the outer side of the front member 16 of the sub-frame 14 and extend obliquely and forwardly therefrom. On the lower end portion of each cylinder 95 is a fitting 95' through which fluid may be introduced into said cylinder to operate the pistons 96.

A sheave 103, having a grooved periphery, is journaled to and between each pair of bearing plates 102. A sheave 104, similar to the sheave 103, is journaled in an upstanding yoke-like bearing 105 having on its lower end a sleeve 106 telescoped onto the upper end portion of each piston rod 97 and secured thereto by a pin 107. The bar 101, at its inner end, is secured to the adjacent longitudinal members 21, see Figs. 2, 5 and 6.

A large drum 108, formed of a channel bar, rests flatwise on the turntable 29 concentric to its axis and is fixed thereto. The cable 94 is anchored at its intermediate portion, relative to the turntable 29, by passing the same completely around a ring 109, that is flat in cross-section, and in securing the same thereto by a clamp 110. The ring 109 lies on the turntable 29, within the drum 108, and extends into an aperture 111 in the web of said drum. The end portions of the cable 94, from the ring 109, extend through the aperture 111 and in opposite directions around the drum 108 and cross one another. One end portion of the cable 94 extends tangentially from the drum 108 toward the ram 92 and under its sheave 103, thence upwardly on one side of the ram 92 and over the sheave 104 and downwardly on the other side of the ram 92 and anchored by a long eye-bolt 112 to the bar 101. This eye-bolt 112 extends through a hole in the bar 101 and a nut 113 applied thereto impinges the under side of said bar.

The other end portion of the cable 94 extends tangentially from the drum 108 toward the ram 93 and extends under its sheave 103, over the sheave 104 and anchored by an eye-bolt 114 in the same manner as the other end portion of the cable 94 is applied to the ram 93. The eye-bolt 114 is fixed relative to the respective pair of plates 102. The end portions of the cable 94 are inserted through the eyes of said bolts 112—114, folded upon themselves and secured by clamps 115 to the cable 94 above said eye-bolts.

The function of the ram 92 is to swing the dipper 116 from a loading position to an unloading position through connections hereinafter described, and the function of the ram 93 is to return the dipper 116 to working position.

The improved digger further includes a dipper 116 of the clam-shell type having an upright dipper stick 117, a short upper boom 118, a hydraulic ram 119, a long intermediate boom 120, a hydraulic ram 121 and a long lower or swing boom 122. The jaws 123 of the dipper 116 are connected by links 124 to an elevator 125 slidably mounted on the dipper stick 117. The elevator 125 is operated by a hydraulic ram 126 in the dipper stick 117 to open and close the jaws 123.

The boom 118 is pivoted, at its inner end, to a bearing 127 on the upper end of the post 79. The cylinder 128 of the ram 119 is pivoted to a lower bearing 129 on the post 79 and its piston rod 130 is pivoted to the boom 118 at its outer end portion. The boom 122, at its inner end, is pivoted to the front end of a dolly 131 having front and rear pairs of lower flanged wheels 132 arranged to run on the lower track rails 26 and front and rear pairs of upper flange wheels 133 arranged to run on the upper track rails 27. The boom 122, near its pivoted inner end, is provided with a pair of rollers 134, one on each side, that roll in a pair of duplicate, vertically disposed serpentine channel runways 135. These runways 135 are on the opposing sides of a pair of laterally spaced plates 136 that extend between the side sections of the frame 15 and secured thereto.

The intermediate boom 120, at its inner end, is pivoted to an upper extension 137 on the dolly 131. The booms 120 and 122 are parallel and pivoted at their outer ends to a rocker 138 which, in turn, is pivoted to a mount 139 therefor fixed to the dipper stick 117. The booms 120—122 are connected at their intermediate portions by front and rear laterally spaced pairs of pivoted links 140 and 141, respectively. The boom 118 is substantially parallel to the boom 120 and connected, at its outer end, to the boom 120 by a pair of laterally spaced links 142. The links 141, at their upper ends, and the links 142 at their lower ends are connected to the boom 120 by a common pivot.

The cylinder 143 of the ram 121 is pivoted to the upper end of an upwardly and forwardly inclined extension 144 of the links 140 and its piston rod 145 is pivoted to a bearing 146 in which the dipper stick 117, at its upper end, is turnably mounted.

The parts just described, to wit: 116 to 146, inclusive, have been shown simply to show a complete digger and are fully shown, described and broadly claimed in a copending application executed of even date herewith.

Figure 11:
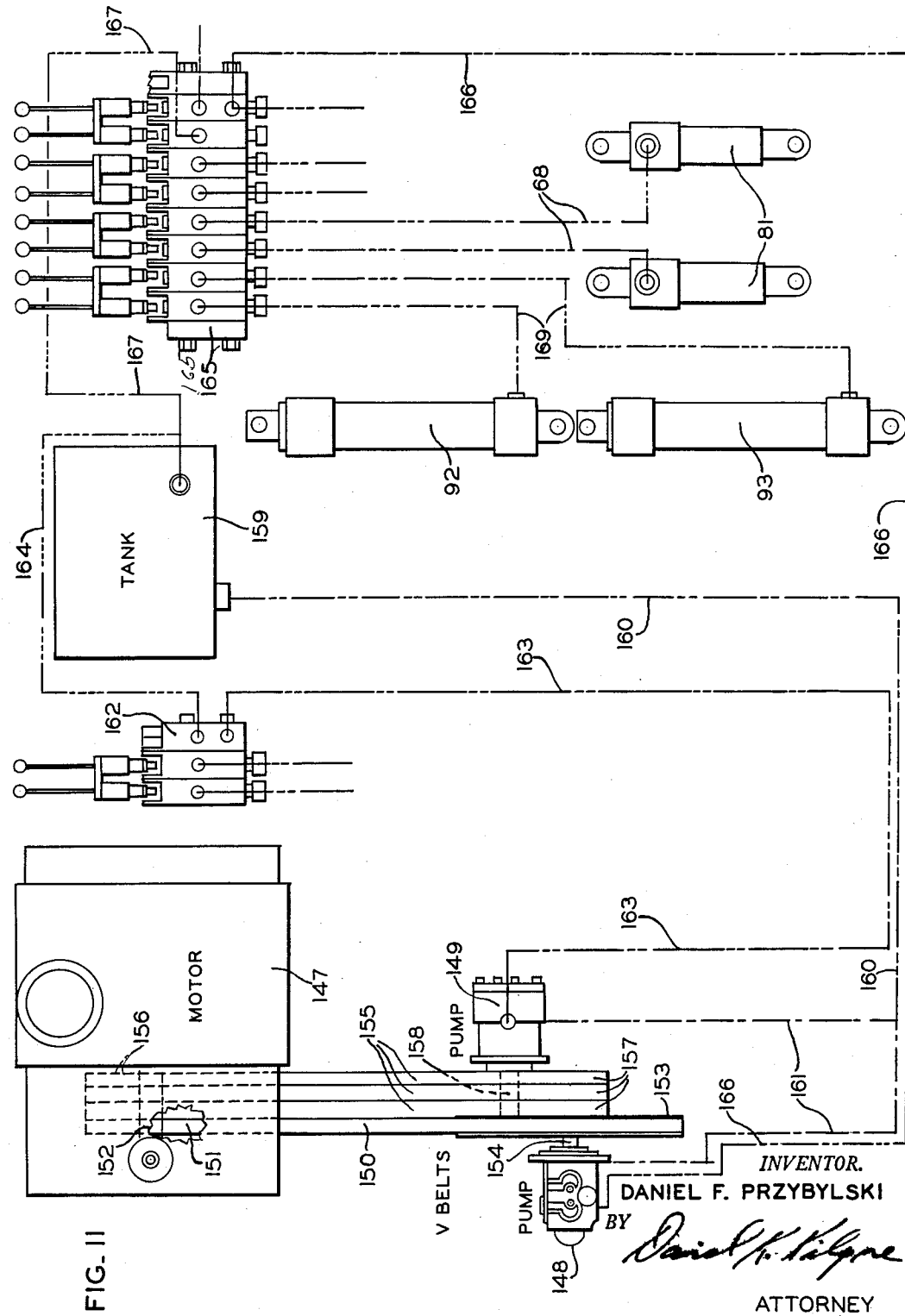
Fig. 11 is a view showing a schematic hydraulic system for the swing and tilting rams.

Referring to Fig. 11 of the drawings, which shows in diagram a hydraulic system for operating the turntable tilting rams 81 and the turn rams 92—93 therefor: This system includes an internal combustion engine 147 which, in actual practice, will be mounted on the base 28, two pumps 148 and 149, the former being driven by a belt 156 that runs over a small sheave 151 on the shaft 152 of the engine 147 and a large sheave 153 on the pump shaft 154. A series of belts 155 run over relatively small sheaves 156 on the engine shaft 152 and relatively large sheaves 157 on the shaft 158 of the pump 149.

The pumps 148—149 are supplied with oil from a tank 159 through a pipe 160 and branch pipes 161 shown thus: — . — . —. Oil under pressure is supplied to a group of control valves 162, fragmentarily shown, by the pump 149 through a pipe 163 shown thus:

— . . — . . —

Spent oil from the valves 162 is returned to the tank 159 through a pipe 164 shown thus: — . . . . — . . . . —. The valves 162 control the oil that operates the rams 119 and 121, but for the purpose of this case it will not be necessary to show the same.

Oil under pressure is supplied to a second group of control valves 165 from the pump 148 through a pipe 166 shown thus: — . . — . . —. Spent oil from the valves 165 is returned to the tank 159 through a pipe 167 shown thus: — . . . . — . . . . —. Certain of the valves 165 control the oil that operates the two tilting rams 81 through pipe 168 that leads therefrom, one to each of said rams. Other of the control valves 165 control the oil that operates the two swing rams 92 and 93 through pipes 169 that lead one to each of said rams. The pipes 168—169 are shown thus: — . . . — . . . —. The ram 126 for operating the elevator 125 and a ram for turning the dipper stick 117 are operated by oil from the other control valves 165, but for the purpose of this case, it will not be necessary to show the same.

From what has been said, it will be understood that the invention described is capable of modifications as to details of construction and arrangement within the scope of the invention herein disclosed and claimed.

Copending with this application are two applications identified as follows:

"Dipper Stick and Dipper Operating Means," filed Oct. 25, 1951, under Serial No. 253,182, and now Patent No. 2,689,661, with claims to dipper stick, means for attaching a dipper to said stick and means for operating the dipper; and "Boom and Boom Operating Means for Dipper Stick," S. N. 253,183, filed October 25, 1951, with claims to a frame, a travelling dolly on the frame, a boom pivoted to the dolly, means for raising and lowering the boom and means for endwise reciprocating the boom during the raising and lowering of the same.

What I claim is:

1. A portable bed, a turntable having a frame, said frame having a pair of axially aligned trunnions, bearings in which the trunnions are journaled, mounts fixed relative to the bed for the bearings, a pair of diametrically opposite hydraulic rams for tilting the turntable and its frame about the axis of the trunnions, each ram comprising a cylinder and a cooperating piston having a piston rod, means pivotally connecting the cylinders relative to the bed and other means pivotally connecting the piston rods to the turntable frame, means for operating the rams, a frame structure, a swivel connecting the frame structure to the turntable to turn about a vertical axis, rollers supporting the frame structure on the turntable, a drum fixed on the turntable, a cable intermediately secured to the drum with its end portion extending in opposite directions therearound and crossed, a pair of hydraulic rams and means for operating the same, each ram comprising a cylinder and a cooperating piston having a piston rod, each cylinder having a mount fixed to the frame structure, a sheave journaled on each mount, a second sheave journaled on each piston rod, a channel bar in the form of a drum fixed on the turntable, a ring in the drum extending into an aperture in the web of the drum and fixed relative to said drum, a cable at its intermediate portion being passed completely around the ring and its end portions crossed and extended outwardly through the aperture and around the drum in opposite directions and again crossed, and means securing the cable to the ring, each end portion of the cable from the drum extending under the first-noted sheave, thence outwardly and over the last-noted sheave, and thence inwardly and anchored relative to the respective mount, said frame structure having a mount for booms and boom-operating means.

2. A bed, a frame mounted on the bed to turn about a horizontal axis, a turntable fixed to the frame, operating means connecting the frame to the bed for tilting the frame and the turntable about said horizontal axis, a second frame overlying the turntable to turn about a vertical axis axially aligned with the axis of the turntable, rollers interposed between the turntable and the second frame, and operating means connecting the turntable and the second frame for turning said second frame.

3. The structure defined in claim 2 in which the first-noted operating means is a pair of diametrically opposite hydraulic rams each including a cylinder pivoted relative to the bed and a cooperating piston having a piston rod pivoted relative to the frame.

4. The structure defined in claim 2 in which the first-noted operating means is a pair of diametrically opposite hydraulic rams, each including a cylinder and a cooperating piston having a piston rod, depending ears fixed to the bed to which the cylinders are pivoted, and upstanding ears fixed to the first-noted frame to which the piston rods are pivoted.

5. The structure defined in claim 2 in which the last-noted frame includes track rails for a boom dolly.

6. The structure defined in claim 2 in which the last-noted operating means is a pair of diametrically opposite hydraulic rams each including an upstanding cylinder fixed to the last-noted frame and a cooperating piston having a piston rod, a sheave journaled on each piston rod, a second sheave journaled on the last-noted frame substantially in the plane of each cylinder, a drum fixed on the turntable substantially concentric therewith, and a cable fixed at its intermediate portion to the drum with its end portions extending in opposite directions around the drum, crossed and extended under the last-noted sheaves, over the first-noted sheaves and secured relative to the last-noted frame.

7. A bed, a turntable mounted on the bed to turn about a horizontal axis, operating means connecting the turntable relative to the bed for tilting the turntable about said horizontal axis, a frame overlying the turntable to turn about a vertical axis, rollers interposed between the frame and the turntable, and a second operating means connecting the frame relative to the turntable for turning the frame.

References Cited in the file of this patent

UNITED STATES PATENTS

| | | |
|---|---|---|
| 708,045 | Houdyshell | Sept. 2, 1902 |
| 1,159,841 | Holt | Nov. 9, 1915 |
| 1,533,061 | Dorward | Apr. 7, 1925 |
| 2,365,168 | Billings | Dec. 19, 1944 |
| 2,397,271 | Ladwig | Mar. 26, 1946 |
| 2,495,143 | Simmonds | Jan. 17, 1950 |
| 2,511,439 | Lacey | June 13, 1950 |
| 2,513,726 | Huston | July 4, 1950 |
| 2,559,733 | Pitman | July 10, 1951 |

FOREIGN PATENTS

| | | |
|---|---|---|
| 560,989 | Germany | Oct. 8, 1932 |
| 116,856 | Australia | Apr. 16, 1943 |
| 594,961 | Great Britain | Nov. 24, 1947 |